May 5, 1953  D. H. MONTGOMERY  2,637,237
RECESSING ATTACHMENT
Filed March 18, 1947  4 Sheets-Sheet 3
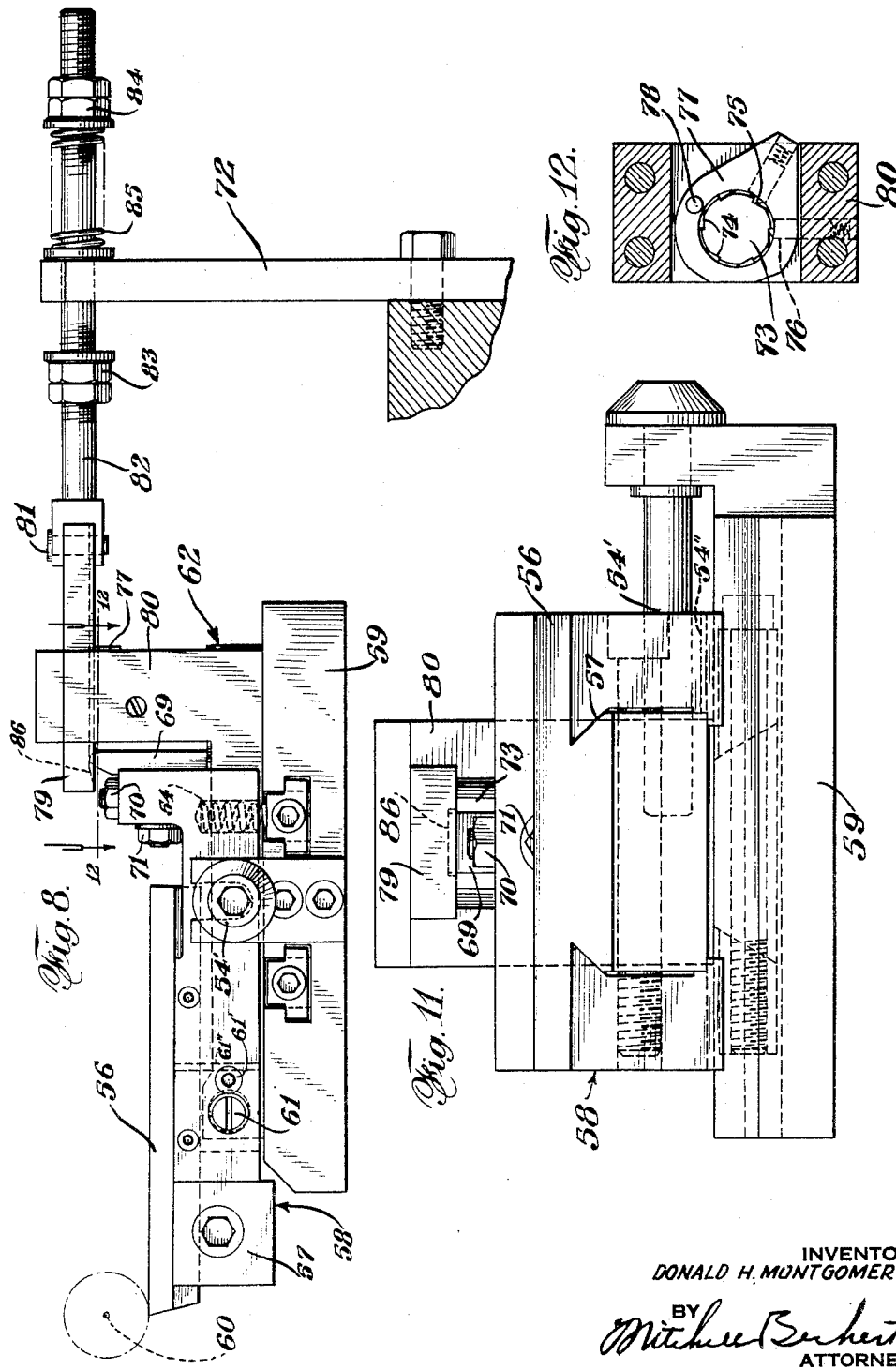
INVENTOR
DONALD H. MONTGOMERY
BY
Mitchell Berhert
ATTORNEYS

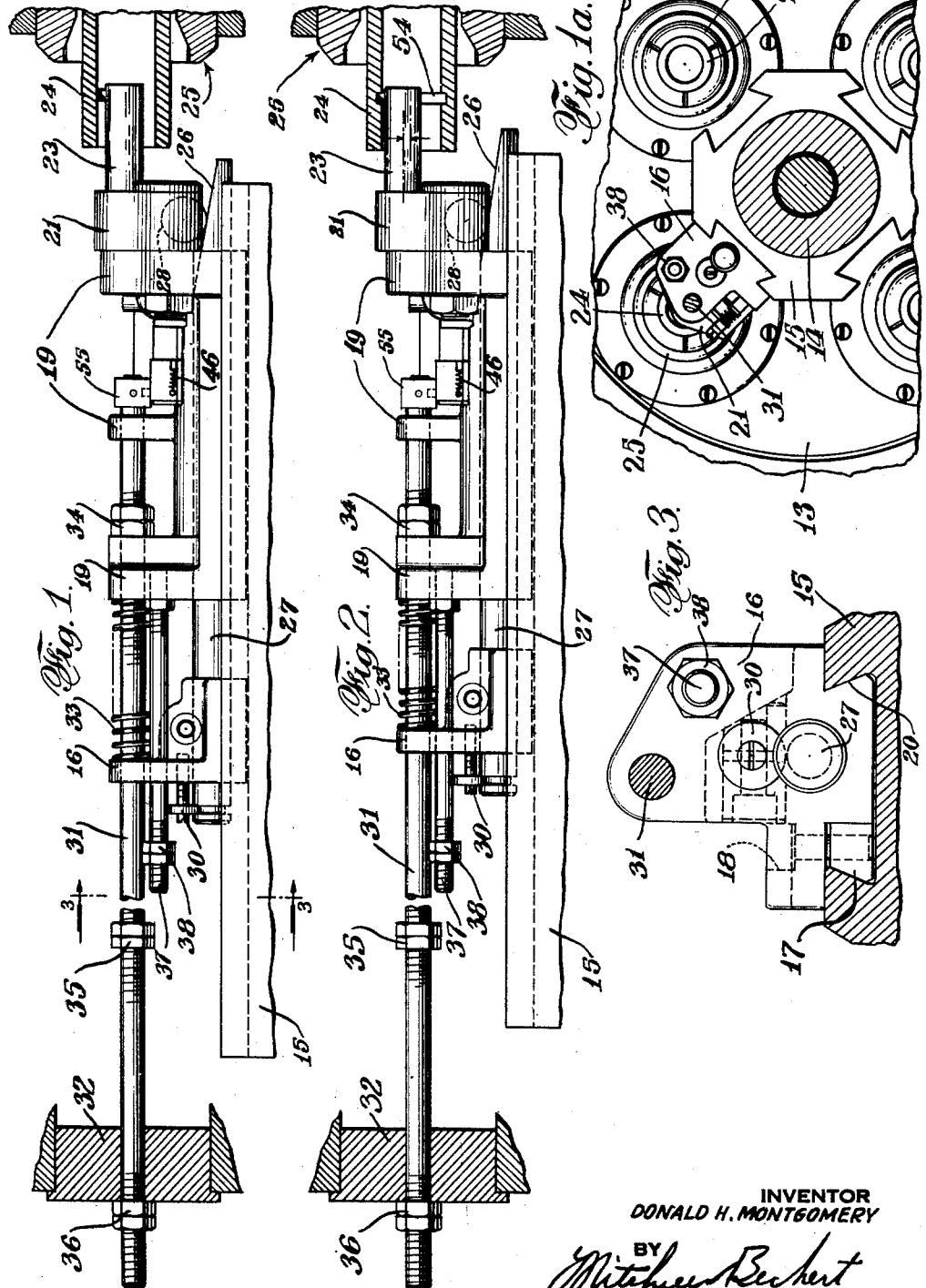

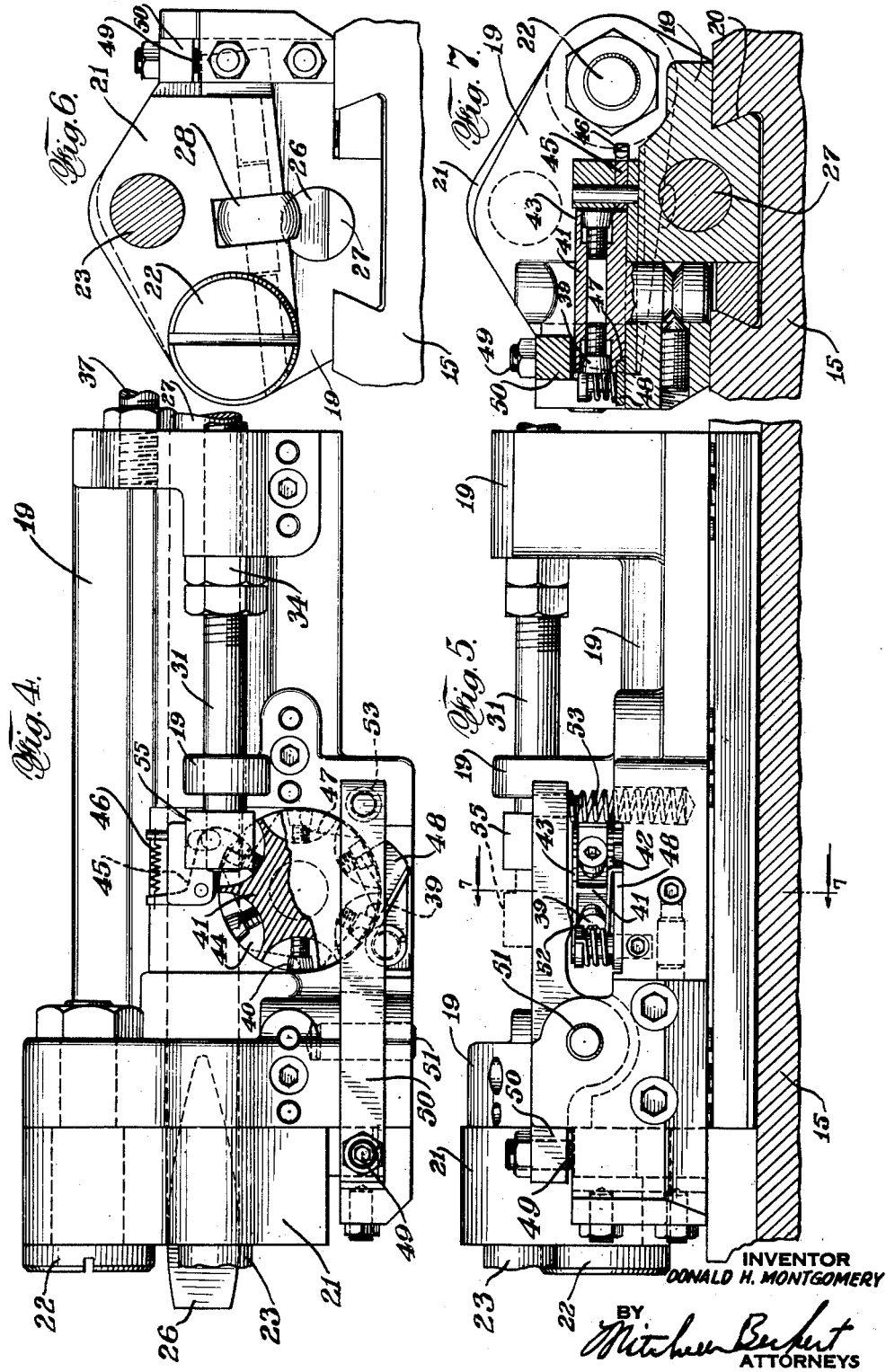

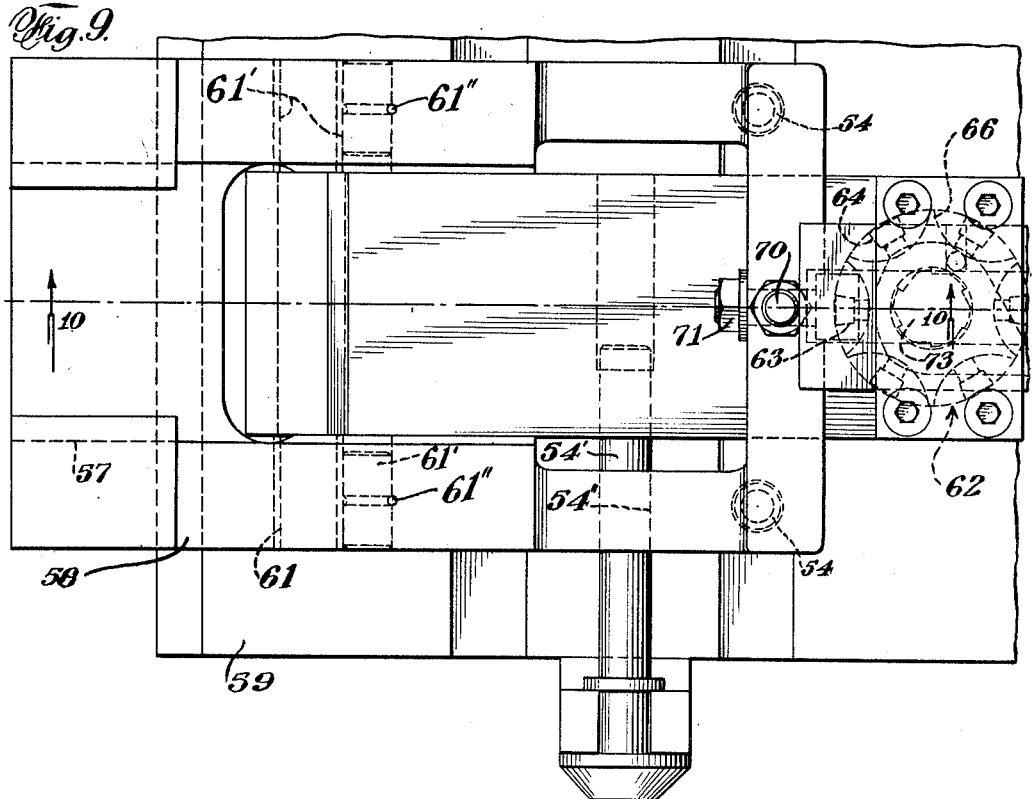
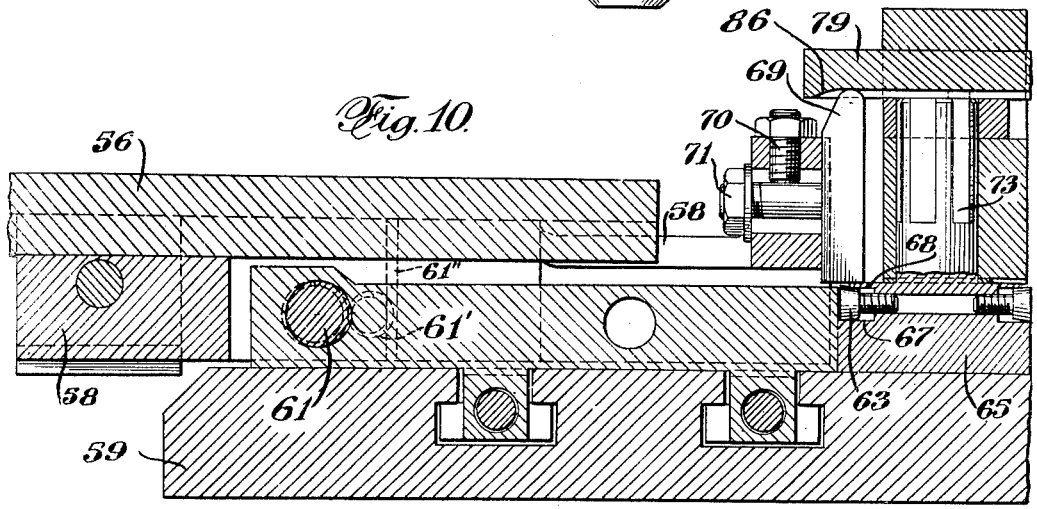

Patented May 5, 1953

2,637,237

UNITED STATES PATENT OFFICE 2,637,237

RECESSING ATTACHMENT

Donald H. Montgomery, West Hartford, Conn., assignor to The New Britain Machine Company, New Britain, Conn., a corporation of Connecticut Application March 18, 1947, Serial No. 735,375

13 Claims. (Cl. 82—24)

My invention relates to a tool-stop mechanism for particular application to multiple-operation automatic machines, such as multiple-spindle screw machines.

It is a fact that no matter how carefully the spindles of a multiple-spindle machine, or, for that matter, the working positions of any automatic indexing machine, may have been located, there may be sufficient error in their placement to cause a particular tool to work with different effectiveness upon stock supported in different spindles.

It is an object of my invention to provide an improved means whereby a given tool may be advanced to the same relative desired position for working the stock carried by any spindle of a multiple-spindle machine.

It is another object to provide, in a machine of the character indicated, an improved calibrated abutment means for variously limiting the feed of a tool holder depending upon the spindle with which the tool holder may be cooperating.

It is a more specific object to provide an improved readily adjustable indexible multi-abutment stop for a tool holder or the like.

It is a further specific object to provide an improved tool holder complete as a unit with an adjustable and indexible stop, for the purpose described.

It is another specific object to provide an improved tool holder and tool-feeding mechanism for performing recessing or necking operations.

It is a further specific object to provide an improved tool-actuating means in a machine of the character indicated.

Other objects and various further features of the invention will be pointed out or will occur to those skilled in the art from a reading of the following specification in conjunction with the accompanying drawings.

In said drawings:

Fig. 1 is a fragmentary side view of a tool slide for a multiple-spindle machine to which a tool-holder mechanism incorporating features of the invention has been applied;

Fig. 1a is a fragmentary left-end view of the tool-slide of Fig. 1, showing the relationship of the tool slide to a plurality of the spindles of the machine;

Fig. 2 is a view similar to Fig. 1, but with the parts shown in different relative positions to illustrate a functioning of the invention;

Fig. 3 is an enlarged partially sectionalized view taken substantially in the plane 3—3 of Fig. 1;

Fig. 4 is an enlarged fragmentary plan view in partial section illustrating features of the tool-holder mechanism of Fig. 1;

Fig. 5 is an enlarged fragmentary side view of the elements of Fig. 4;

Fig. 6 is a left-end view of the elements of Fig. 4;

Fig. 7 is a sectional view taken substantially in the plane 7—7 of Fig. 5;

Fig. 8 is a side view of another type tool holder incorporating features of the invention;

Fig. 9 is an enlarged fragmentary plan view of parts of the mechanism of Fig. 8 (with the tool removed);

Fig. 10 is a sectional view taken substantially in the plane 10—10 of Fig. 9;

Fig. 11 is an enlarged left-end view of the mechanism of Fig. 8; and

Fig. 12 is an enlarged sectional view taken substantially in the plane 12—12 of Fig. 8.

Broadly speaking, my invention contemplates an improved tool holder and tool-feeding means therefor. In connection with these improved devices, I prefer to employ indexible stop means carried with a tool-slide for determining a limiting position of a tool holder in accordance with various preadjustments, depending upon the exact location of each spindle of a multiple-spindle machine. The stop means is indexible with each indexing operation of the machine, so that a properly calibrated abutment may be presented to the tool holder or to its feed mechanism for each spindle position.

Referring to Figs. 1 through 7 of the drawings, my invention is shown in application to the tool holder for a so-called recessing tool, that is, a tool for forming an annular recess within a hollow or bored piece of stock. The tool holder may be and preferably is mounted upon a so-called Gridley tool slide 15 which is longitudinally slidable on a supporting arbor 14 and regularly advanced toward and retracted from the working area in timed relation with each indexing operation of the spindles, i. e. of the spindle carrier 13. Suitable timing mechanisms for indexing the spindles of the machine and for advancing and retracting the tool slide 15 are well known and therefore form no part of the present invention.

In accordance with a feature of the invention, the tool-holder mechanism carried by the tool slide 15 consists essentially of three parts—a first bracket member 16 anchored to the tool slide 15 as by an adjustable dovetail 17 and set screw 18, a second bracket member 19 longitudinally slidable with respect to the tool slide 15 as in the dovetail slot 20, and a tool holder proper 21 pivotally supported as by the shank of a bolt 22 for rocking feed. The tool holder 21 may support a tool 23 for recessing or necking operations within or on tubular or bored stock 24—24', which is in turn supported for rotation in conventional spindle noses 25—25'. Rocking feed for the tool holder 21 may be applied by a camming mechanism, operative upon relative longitudinal displacement of the first and second bracket members 16—19 with respect to each other. In the form shown, a gradually sloping wedge 26 formed on the end of a rod 27 provides the necessary camming surface, and a roller 28 on the tool holder 21 assures smooth camming action. The cam rod 27 is preferably fixed with respect to the tool slide, and its camming position may be adjustably located as by selectably positioning a threaded member 30 which engages the first or fixed bracket member 16 as well as the cam or wedge bar 27.

Motion of the parts described is further limited by a longitudinally extending brace or stop rod 31 slidable with respect to the first bracket member 16 and with respect to the second bracket member 19 and with respect to a fixed part 32 of the machine. A compression spring 33 wound about the rod 31 serves resiliently to spread the first and second bracket members 16—19, and there are three abutments carried by the rod 31—a first longitudinally adjustable abutment 34 for engaging a part of the bracket member 19, a second longitudinally adjustable abutment 35 for engaging the frame part 32 when moving in a retracting direction, and a third longitudinally adjustable abutment 36 for engaging the frame part 32 upon an advancing motion of the tool slide 15.

A second longitudinally extending rod or brace 37, in connecting the first and second bracket members 16—19 together, permits a certain amount of lost motion between these members. In the form shown, a rod 37 is threadedly secured to the bracket member 19 and is slidable with respect to the bracket member 16. A longitudinally adjustable abutment 38 on rod 37 determines the extent of lost motion.

In accordance with a feature of the invention, precalibrated stop means are associated with the tool holder 21, whereby the tool feed will always be limited to an extent appropriate for the spindle 25, 25', etc. with which it may be cooperating. In the form shown, the stop means are built around a series of adjustable wedges 39—40 in the form of screws having frusto-conical heads. The wedges 39—40 are preferably equally spaced along or about an indexible base member or core 41, which is shown to comprise a core (in which the wedges 39—40 are radially adjustable), a bottom or seating flange 42 (in sliding abutment on one side with a firm surface, say, on the bracket member 19, and, on the other side, intercepting a part of each wedge), and an upper or abutment flange 43 having a deformable part intercepting a part of each wedge. There is preferably a separately adjustable wedge 39—40 for each working position or spindle of the machine to which my invention is applied. If desired, recesses 44 may be milled out of a core 41, one recess 44 for each of the wedges 39—40, thereby forming the core 41 and the flanges 42—43 as a single piece.

In order to index the adjustable stop means for each indexing of the spindles 25, pawl and ratchet means may be related to a fixed part 32 of the machine. In the form shown, the rod 31 carries at one end a pawl member 45, resiliently held as by a spring 46 in ratcheting engagement with suitably recessed portions 47 of the flange 42. A spring-urged keeper 48 also engaging the ratchet recesses 47 may serve to counteract any tendency of the stop means 41 to index backward upon a ratcheting operation of the pawl 45, as will be clear.

With each feeding of the tool 23, as by action of the wedge-cam surface 26, the tool holder 21 is rocked until its movement is limited by a stop member 49. The member 49 is shown to be a screw adjustably threaded on a rockable lever 50, which in turn is pivotally supported as at 51, by the bracket member 19. In accordance with a feature of the invention, a part 52 of the rocking lever 50 is in abuttable relation with the deformable flange part 43 of the adjustable stop means 41. Resilient means such as a spring 53 serves to keep the rocking lever 50 in continuous abutment with the tool holder 21 and to assure that the tool holder 21 will always closely follow the cam surface 26. Abutment of the part 52 with the stop means 41 is preferably immediately over one of the adjustable wedges 39, whereby regardless of the indexed position of the adjustable stop means 41, there will always be an adjustable wedge 39—40 in position for limiting the feed of the tool holder 21.

For a better understanding of the cooperation of parts which have thus far been described, a cycle of operations will be outlined. Let it be assumed that the spindle carrier 13 has just completed an indexing operation so as to place the work 24 in position for a working operation by the recessing tool 23, and that the tool slide 15 and the tool 23 are longitudinally retracted from the work 24. Timing means such as a cam (not shown) will longitudinally move the tool slide 15 along its arbor 14 to the position shown in Fig. 1, wherein an abutment of the stop nuts 36 against a frame part 32 and an abutment of the stop nuts 34 against the slidable bracket member 19 is shown to limit the forward longitudinal displacement of the tool 21. This first part of the forward motion of the tool slide 15 may be and preferably is a so-called jump (i. e. relatively fast) feed operation.

After the parts have been arranged as in Fig. 1, the working feed of the tool holder 21 is commenced by a preferably relatively slow forward longitudinal feed of the tool slide 15. This operation terminates with the parts arranged as shown in Fig. 2, wherein it will be appreciated that the cam surface 26 has actuated the tool holder 21 against a compression of the spring 33 (between brackets 16 and 19), the working feed of tool 21 being limited by the final homing abutment of the part 52 with the adjustable stop means 41. This limiting working feed for work held by the particular spindle 25 will be understood to have been determined by appropriate preadjustment of the adjustable wedge 39.

Upon completion of the cutting operation, a first retraction of the tool slide 15 returns the parts to the relationship shown in Fig. 1 (i. e. with the tool radially retracted from the recess 54 that it has machined), and radial retraction will continue until the stop nuts 38 abut the bracket member 16. Radial tool retraction will then be complete, and longitudinal tool retraction will commence—since the tool slide is then directly coupled to the tool holder 21 by way of the fixed bracket 16, the top nuts 38, the rod 37, and the slidable bracket member 19.

Further retraction of the tool slide 15 removes the tool from the bore of the work, and the parts remain in essentially the same relative positions until the stop nuts 35 abut a fixed part 32 of the machine. This latter abutment preferably occurs near the end of the retracting stroke of the tool slide 15; it serves to hold the rod 31 for a sufficient period of time to allow for a forcible indexing operation of the pawl 45. In the course of this indexing operation, the housing 55 for supporting the pawl 45 on the rod 31 will move with respect to the bracket member 19 (see the longitudinal difference in placement of solid and dotted outlines for the housing 55 in Fig. 5), and this pawl motion will rotatably carry the stop means 41. Another adjustable wedge 40 will then be understood to be positioned for appropriately limiting the feed of the tool holder 21 for the next working cycle (i. e. after the spindle carrier 13 has been indexed again). Once more, the tool slide 15 commences its forward longitudinal displacement; in so doing, the stop nut 36 will first abut the frame part 32 so as to retract the pawl 45 back to the position shown in Fig. 4 (for engagement with another ratchet recess 47).

It will be appreciated that the described cycle of operations will repeat itself for successive indexed spindle positions and that for each piece of work supported in a separate spindle a different preadjusted stop is presented to the tool holder for limiting the depth of tool cut.

Referring now to Figs. 8 through 12, my invention is shown in application to a side-working or forming-type tool, such as a skiving tool 56, which may also be employed on a multiple-spindle machine of the character indicated. The tool 56 may be conventionally mounted as by adjustable dovetail means 57 to a tool holder 58, which in turn is carried by a side-working tool slide 59. The tool slide 59 may be supported for generally radial displacement with respect to a given spindle position 60 on the machine and may be fed for such displacement by known means (not shown).

In accordance with a feature of the invention indexible preadjusted stop means may be applied to the tool slide and holder 58—59, appropriately to limit the feed of the tool holder 58 in accordance with the exact location of the spindle 60 with which the tool holder 58 may then be cooperating. In the form shown, the tool holder 58 is pivotally supported on the tool slide 59, as by a transversely extending bolt 61, and the adjustable stop means limitingly positions the rocking aspect of the tool holder 58 with respect to the tool slide 59. If desired, play in the pivotal support 61 of the tool holder 58 may be materially reduced by appropriate adjustment of cylindrical members 61' having eccentrically formed grooves formed therein, for coaction with pins 61''. I prefer that the tool holder 58 be constantly resiliently urged as by a spring 54, to rock the tool 56 in a direction away from the work and for other reasons which will later be clear. Transversely extending pin means 54', engaging the tool slide 59, and a short vertical slot 54'' in the tool holder 58, serve to retain the tool holder against rocking disengagement from spring 54, as will be clear.

In the arrangement shown, the adjustable and indexible stop means 62 are carried by the tool slide 59 and are preferably located so that the point of abutment for determining the limiting rocking of the tool holder 58 about its pivotal support 61 occurs relatively remote from the pivotal support 61. The adjustable stop means is, therefore, mounted at the back end of the tool slide 59 (right-hand end, in the sense of Fig. 8).

Again, as in the arrangement described for Figs. 1 through 7, the adjustable stop means 62 may comprise a plurality of wedge members 63—64 radially positioned about a core member 65, which may be journalled in the tool slide 59 for indexible rotation with respect thereto. In the form shown, the core member 65 is machined with a plurality of recesses 66 to accommodate radially adjustable wedges 63 so as to form relatively fixed abutment surfaces 67 against which the wedges 63 may react. Machining of the recesses 66 also preferably serves to define relatively deformable flange means 68 for coaction with the upper side of the wedge 63 in a manner similar to that described in the case of Figs. 1 through 7.

An abutment member 69 carried by the tool holder 58 is positioned for abutment with the deformable flange 68, as adjustably positioned by radial location of the wedge 63. For ease in an initial setting up of the machine the abutment member 69 may be slidably and adjustably positioned on the tool holder 58, as by means of suitable screws and nuts 70—71.

For indexing, the stop means 65 may be associated with a pawl-and-ratchet mechanism which, like the first-described arrangement, may be related to a fixed part 72 of the machine. In the form shown, a ratchet member 73 is carried by or formed with the stop means 65 and includes a plurality of ratchet recesses 74 for engagement with a resiliently urged pawl member 75. Again, a resiliently urged keeper member 76 serves to prevent a backward indexing of the stop means 65 upon an escapement operation of the pawl 75. The pawl 75 is shown to be supported in a housing member 77 extending circumferentially of the ratchet member 73 and carrying a pin 78 for cranking engagement with an actuator, such as the slide member 79.

The slide member 79 is longitudinally slidable in ways defined by an upstanding part 80 of the tool slide 59, and its motion is limited by a lost-motion connection to a fixed part 72 of the machine. In the form shown, the slide member 79 is pinned as at 81 to a rod 82 having adjustable stop members 83—84 on both sides of the fixed part 72 of the machine. Resilient means such as a spring 85 acts constantly to urge the slide 79 in a retracting direction (to the right, in the sense of Fig. 8).

In accordance with a feature of the invention the slide member 79 may perform the additional function of ramming the abutment member 69 down upon the stop means 62 so as to limit the working feed of the tool 56. To perform this function a cam surface 86 may be milled out of the underside of slide 79, whereby it may actuate the abutment member 69 with greatest force when the tool is most extended toward the spindle 60, as will be clear.

A cycle of operations will be described for the arrangement of Figs. 8 through 12. Assume that the tool slide 59 is fully retracted, in which case the stop nuts 83 will be in abutment with the frame member 72 so as to displace the slide 79 with respect to its support member 80 and thus to disengage the abutment member 69 from its wedged position between the cam surface 86 and the adjustable stop 65. The spring 54 will then be urging the tool holder 58, and with it the abutment member 69, out of engagement with flange 68 of the indexible stop 65.

A first feed of the tool slide 59 will serve to disengage the stop nuts 83 from abutment with the frame part 72 so as resiliently to force the cam surface 86 in engagement with the abutment member 69. The angular positioning of the abutment member 69 with respect to the pivotal axis 61 of the tool holder 58 will then be determined by the adjustment of the cam 63 or the indexible core 65, and this limiting position of the tool holder will be understood to effect a calibrated limiting feed for the tool 56 in its working relation with the particular spindle 60.

After accomplishment of the cut, a first retraction withdraws the tool 56 from the cutting area, and the parts remain in the position shown in Fig. 8 until the stop nuts 83 abut the fixed part 72. Further retraction of the tool slide is accompanied by a relative movement of the cam surface 86 with respect to the tool slide 59, resulting in a disengagement of the abutment member 69 from the flange 68 and in a cranking (counterclockwise, in the sense of Fig. 12) of the pin 78, which carries with it the pawl 75. This motion of the pawl 75 will be understood to effect an indexing of the stop means 65 so as to position the next succeeding adjustable cam or wedge 64 in line with the abutment member 69. The first effect of thereafter feeding the tool slide 59 toward the work is to reset the ratchet pawl 75 for performing another indexing operation, but this latter indexing will not occur until after the second cycle of work and of spindle indexing have been accomplished.

It will be seen that I have described a relatively simple and ingenious mechanism, adaptable to a plurality of types of tool slide and of tool holder, for assuring that all cuts made by tools on an automatic spindle machine of the character indicated may be performed with a maximum of precision and that this precision may be substantially independent of inaccuracies in the journaled setting of spindles on the spindle carrier. The device lends itself to employment with all types of tools, whether end-working, side-forming, recessing, and others.

It is particularly to be noted that my indexible stop is so compact as to lend itself to adaptation in a tool holder or in a tool slide, and thus be positioned relatively close to the work, whereby its feed-limiting function may be performed with maximum effectiveness. The provision of an indexible stop for each tool holder, according to the invention, clearly offers advantages over earlier indexible devices wherein a single set of adjustable stops serves all tool holders.

In a broader sense, my invention will be understood to provide an improved feeding means for machines of the character indicated. The employment of a wedge or other cam means effective very near to the tool itself, and preferably independent of the machine's main tool-slide-feeding cams (not shown), clearly makes for greater precision of work—particularly when such wedge or cam means is readily accessible for calibrating adjustment.

While I have described my invention in detail for the preferred forms shown, it will be understood that modifications may be made within the scope of the invention as defined in the claims which follow.

I claim:

1. In a machine of the character indicated, a movable tool slide, tool-holder means on said slide and movable relatively to said slide, feed means for said tool-holder means, and actuable relatively to said tool slide upon a movement of said slide, and stop means cooperating between said tool-slide means and said tool-holder means and including adjustable means carried with one of said tool-slide and tool-holder means for determining a limiting feed position of said tool-holder means, said adjustable means including cam abutment means and adjustable mechanism for controlling the effectiveness of said cam abutment means.

2. As an article of manufacture, a tool-holder including a base to be mounted on a tool slide, tool-supporting means movably mounted on said base, stop means for said tool-supporting means and comprising a plurality of separately adjustable stops, and displacement means for said stop means, whereby successive adjusted stops may be positioned for determining a limiting position of said tool-supporting means relative to said base, said displacement means including means engageable with a fixed part of a machine to which said article is to be adapted, whereby upon a movement of said tool holder relatively to the machine said displacement means may be effective to change the position of said stop means.

3. In a recessing attachment for a multiple-spindle machine, longitudinally displaceable tool-slide means, tool-holder means carried thereby, lost-motion means between said tool-holder means and said tool-slide means, means effective during the lost-motion period of said lost-motion means for effecting a working feed of said tool-holder means, and stop means for determining a limiting position of the working feed of said tool-holder means, said stop means comprising a plurality of abutment surfaces, and indexing means for indexing successive abutment surfaces for each feeding of said tool-holder means.

4. A machine according to claim 3, in which said tool-holder means includes a rockable tool-holder for accomplishing the working stroke with a rotary motion, and cam means for effecting such rotary motion during the lost-motion period of said lost-motion means.

5. In a multiple-spindle machine of the character indicated, tool-slide means slidable generally transversely of the machine, tool-holder means pivotally supported on said tool-slide means, abutment means for said tool-holder means and carried by said tool-slide means, and wedge means engageable with said tool-holder means for forcibly abutting said tool-holder means against said abutment means, said abutment means comprising a plurality of adjustable abutments, said plurality corresponding to the number of spindles on said machine, and positioning means cooperating with actuation of said wedge means for positioning a different abutment for said tool-holder means for each spindle of the machine.

6. A device according to claim 5, in which said wedge means is slidable with respect to said tool-slide means, and in which a connection is provided between said wedge means and a fixed part of said machine.

7. A machine according to claim 5, in which said wedge means is slidable with respect to said tool-slide means, in which resilient connecting means connect said wedge means to a fixed part of said machine for resilient application of wedging forces upon said tool-holder means, and in which an adjustable rigid abutment on said connecting means is engageable with a fixed part of said machine forcibly to dislodge said wedge means from said tool-holder means.

8. A device according to claim 5, in which said wedge means is slidable with respect to said tool-slide means, in which a connection is provided between said wedge means and a fixed part of said machine, and in which said positioning means comprises a ratchet mechanism engageable with said wedge means, whereby positioning of said abutments may be effected during an operation of said wedge means.

9. In a machine of the character indicated, tool-slide means including guide means for determining a path of movement for said tool-slide means, tool-holder means pivotally supported by said tool-slide means, tool-holder actuating means including a wedge-like surface engaging said tool-holder means, said tool-holder actuating means being slidable relatively to said tool-slide means in the sense of the path of movement of said tool-slide means, whereby upon movement of said actuating means with respect to said tool-holder means a feed may be imparted to a tool offset from the pivotal axis of said tool-holder means.

10. A machine according to claim 9, in which said tool-slide means includes a first member and a second member guided for relative movement on an axis parallel to that determined by said guide means, said tool-holder means being pivotally supported by said first member, and in which said actuating means may be longitudinally adjustably secured to said second member.

11. In a tool-slide mechanism for a machine of the character indicated, a first member to be secured to a tool slide, a second member longitudinally slidable with respect to the tool slide, a spring coacting between said members for resiliently urging said second member in a work-engaging direction, abutment means associated with the frame of the machine for limiting the resiliently urged displacement of said second member, and further abutment means cooperating between said members for limiting the resiliently urged displacement of said second member.

12. In a multiple-spindle machine of the character indicated, tool-slide means slidable generally transversely of the machine, tool-holder means pivotally supported on said tool-slide means, abutment means for said tool-holder means and carried by said tool-slide means, and wedge means engageable with said tool-holder means for forcibly abutting said tool-holder means against said abutment means, said abutment means comprising a plurality of adjustable abutments.

13. As an article of manufacture, tool-holder means including a base member to be mounted on a movable tool slide, a tool-supporting member movably supported on said base member, feed means for said tool-supporting member and actuable upon a movement of the tool slide for feeding said tool-supporting member relative to said base member, and adjustable stop means including abuttable parts carried by said tool-supporting member and by said base member, one of said parts being adjustable relatively to the other, whereby said parts may determine a limiting feed for a tool carried by said tool-holding means.

DONALD H. MONTGOMERY.

References Cited in the file of this patent

UNITED STATES PATENTS

| Number | Name | Date |
|---|---|---|
| 767,592 | Orbison | Aug. 16, 1904 |
| 999,629 | Chard | Aug. 1, 1911 |
| 1,506,737 | Drissner | Sept. 2, 1924 |
| 1,716,303 | Cone | June 4, 1929 |
| 1,729,863 | Biewend et al. | Oct. 1, 1929 |
| 1,794,390 | Trobeck | Mar. 3, 1931 |
| 1,906,100 | Richardson | Apr. 25, 1933 |
| 1,950,039 | Smith et al. | Mar. 6, 1934 |
| 2,142,557 | Cone | Jan. 3, 1939 |
| 2,325,571 | Montgomery | July 27, 1943 |
| 2,365,196 | Honegger | Dec. 19, 1944 |
| 2,441,533 | Montgomery | May 11, 1948 |
| 2,495,291 | Schlitters | Jan. 24, 1950 |